H. KELLOGG.
Rolls for Metal Rolling-Mills.
No. 133,454.            Patented Nov. 26, 1872.
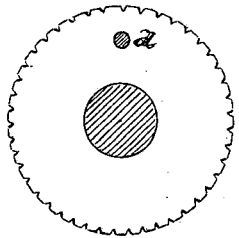
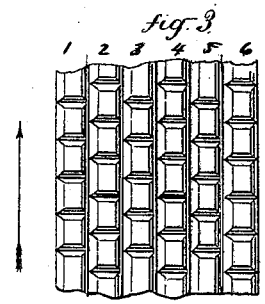
Henry Kellogg
Inventor

UNITED STATES PATENT OFFICE.

HENRY KELLOGG, OF MILFORD, CONNECTICUT.

IMPROVEMENT IN ROLLS FOR METAL-ROLLING MILLS.

Specification forming part of Letters Patent No. 133,454, dated November 26, 1872.

*To all whom it may concern:*

Be it known that I, HENRY KELLOGG, of Milford, in the county of New Haven and State of Connecticut, have invented a new Improvement in Rolls for Rolling Metal Rods, Shafting, &c.; and I do hereby declare the following, when taken in connection with the accompanying drawing and the letters of reference marked thereon, to be a full, clear, and exact description of the same, and which said drawing constitutes part of this specification, and represents, in—

Figure 1, a side view; Fig. 2, one of the disks; and in Fig. 3, a diagram of a portion of the surface of the roll.

This invention relates to an improvement in the construction of rolls for rolling shafting, round rods, or axles, with especial reference to the machine for this purpose, for which I filed an application for patent January 29, 1872; the object of the invention being to give to the article being wrought the effect of rapid successive blows; and it consists in constructing the surface of the rolls with projections upon their surface, alternating with each other, so that one projection will cover the recess between the two next longitudinal similar projections, and so on through the length of the roll, the recesses alternating, or out of longitudinal line one with another, the spaces being narrower than the extent of the projections.

A is the shaft, constructed with bearings B, arranged and revolved in like manner as in my application before referred to—that is to say, the article being wrought passing longitudinally between the rolls, the axis of the bar or article being wrought being in a line parallel to the axis of the shaft. Onto this shaft, at one end, a plain disk, C, is set against a shoulder, *a*, or otherwise held thereon; then onto the shaft are successively placed other disks, 1, 2, 3, 4, &c., of equal diameter, and the periphery of each of these disks is notched, as seen in Fig. 2, to form projections, each of the said projections being broader than the notch between, and each edge of the disk chamfered, as seen in Figs. 1 and 3. Fig. 3 shows a diagram of the surface of these successive disks. The second disk is in such relative position to the first that the whole of the notch in the second disk is more than covered by the projection on the first disk, and so on, each successive disk bearing the same relative position to the preceding or last-placed disk; therefore the projections on the second disk will strike upon the bar before the projections on the first disk have left it; but, the roll revolving, each notch makes a stop in the action of the roll, so that the projection, coming quickly onto the surface of the rod, produces, practically, a blow or percussive effect on the metal, and each projection throughout the entire roll produces a like effect on the rod, it being essential that the immediate successive notches should not come in axial line with the preceding. In order to facilitate the placing of the disks and retain them in their proper relative positions, each disk is bored as at *d*, Fig. 2, and through these holes a rod is placed, as in Fig. 1. Lastly, a disk, D, is screwed or forced onto the shaft to compress and hold the disks together.

I claim as my invention—

1. A roll for rolling metal rods, shafting, &c., in which the surface is formed in a succession or series of projections, the said projections being in the relative position to each other and proportioned to the spaces or recesses between the said projections longitudinally, as described, so that one projection completely covers the recess or space between the next two.

2. A roll for rolling metals, composed of a series of disks, the periphery of each disk cut or formed into alternate projections and notches, and arranged relatively to each other, substantially as described.

HENRY KELLOGG.

Witnesses:
A. J. TIBBITS,
J. H. SHUMWAY.